United States Patent
Pullmann

(12)
(10) Patent No.: US 6,787,940 B2
(45) Date of Patent: Sep. 7, 2004

(54) SAFETY SWITCHING DEVICE AND METHOD FOR SELECTING AN OPERATING MODE OF A SAFETY SWITCHING DEVICE

(75) Inventor: Jürgen Pullmann, Ebersbach (DE)

(73) Assignee: Pilz GmbH & Co., Ostfildern (DE)

( * ) Notice: Subject to any disclaimer, the term of this patent is extended or adjusted under 35 U.S.C. 154(b) by 71 days.

(21) Appl. No.: 10/264,070

(22) Filed: Oct. 3, 2002

(65) Prior Publication Data

US 2003/0030330 A1 Feb. 13, 2003

Related U.S. Application Data

(63) Continuation of application No. PCT/EP01/03381, filed on Mar. 24, 2001.

(30) Foreign Application Priority Data

Apr. 4, 2000 (DE) .......................................... 100 16 712

(51) Int. Cl.⁷ .............................. H02H 1/00; H01H 9/00
(52) U.S. Cl. ........................................ 307/326; 307/116
(58) Field of Search ................................. 307/116, 117, 307/125, 139, 326, 141.4; 361/1; 340/825

(56) References Cited

U.S. PATENT DOCUMENTS 4,473,876 A   9/1984 Minnich
5,331,214 A * 7/1994 Mori et al. .................. 307/116
5,598,042 A * 1/1997 Mix et al. .................... 307/116
6,246,318 B1  6/2001 Veil et al.
6,650,029 B1 * 11/2003 Johnston ...................... 307/125

FOREIGN PATENT DOCUMENTS

| DE | 40 33 801 C1 | 12/1991 |
| DE | 197 07 241 A1 | 9/1998 |
| DE | 197 36 183 C1 | 2/1999 |
| EP | 0 428 338 A2 | 5/1991 |

\* cited by examiner

*Primary Examiner*—Gregory J. Toatley, Jr.
(74) *Attorney, Agent, or Firm*—Harness, Dickey & Pierce, P.L.C.

(57) ABSTRACT

The invention relates to a safety switching device for connecting and reliably disconnecting an electrical load in response to a switching event from a safety transmitter. The safety switching device has at least a switching element and an operating mode selector unit for selecting an operating mode in response to a defined input signal. An input port is provided, which is connected to the operating mode selector unit such that the defined input signal can be supplied to the latter. The operating mode selector unit is designed such that it identifies the defined input signal as one from a group of different defined input signals. Responsive thereto, it selects an operating mode.

17 Claims, 2 Drawing Sheets

SAFETY SWITCHING DEVICE AND METHOD FOR SELECTING AN OPERATING MODE OF A SAFETY SWITCHING DEVICE

CROSS-REFERENCES TO RELATED APPLICATIONS

This application is a continuation of copending international patent application PCT/EP01/03381 filed on Mar. 24, 2001 and designating the U.S., which claims priority from German patent application DE 100 16 712.8, filed on Apr. 4, 2000.

BACKGROUND OF THE INVENTION

The present invention relates to a safety switching device for connecting and reliably disconnecting an electrical load in response to a switching event of a safety transmitter. The invention particularly relates to a safety switching device having at least one output switching element and one operating mode selector unit for selecting an operating mode in response to a defined input signal.

The invention also relates to a method for selecting an operating mode of such a safety switching device.

Safety switching devices of the above-mentioned type are generally known. By way of example, the applicant offers various versions of safety switching devices under the name "PNOZ". Safety switching devices such as these are primarily used in the industrial area, in order to connect and reliably disconnect electrically driven machines, such as a press or a milling tool. They are used in particular in conjunction with a mechanically operable safety transmitter, for example an emergency off button, to disconnect the machine quickly and safely in an emergency situation. For this purpose, the power supply to the machine to be disconnected is passed via make contacts of two electromechanical switching elements. As soon as even only one of the two switching elements opens its make contacts, the power supply to the machine is interrupted.

The safety switching device thus carries out the task of safely evaluating the switching event produced by the safety transmitter and, in response thereto, of operating electronic and/or electromechanical switching elements, which then disconnect the power supply to the machine.

Since they are used in safety-critical areas, the safety switching devices referred to here require a specific operating approval, from the responsible supervisory authorities, in many countries. For this purpose, the intrinsic fail-safe nature of the devices must be verified in accordance with the Standards that exist, such as the European Standard EN 954-1. This has a considerable disadvantageous effect on the design freedom for the design and development of safety switching devices in comparison to "normal" switching devices. In consequence, the expression "safety switching device" is in this case intended to mean only those devices which have a relevant operating approval or, in the absence of such an approval, at least satisfy the requirements of Safety Category 3 of the above-mentioned Standard EN 954-1.

In addition to the emergency off switches which have been mentioned, a large number of other safety transmitters can be used, for example guard door switches, light barriers etc. Owing to the different requirements and alignments of these safety transmitters, the operating mode of the safety switching device needs to be matched to the type of safety transmitter that is used.

In this connection, the term "operating mode" relates not only to the selection of specific types of operation of the device, for example whether (constant) steady-state or pulsed output signals are generated, but also to the selection of specific operating parameters, such as delay times of different duration for disconnection.

One possible way to match the devices to different requirements has simply been to provide a dedicated safety switching device for each type of safety transmitter. However, this involves increased storage requirements and problems with repair, since only that safety switching device which is respectively matched to the corresponding type of safety transmitter can be used.

In order to avoid this situation, the applicant has proposed a safety switching device as it is disclosed in DE 197 07 241 A1, where different safety transmitters from a set of possible safety transmitters can be connected. In this case, a typical combination of input ports and output ports to be used is assigned to each safety transmitter in the set. The way in which a specific safety transmitter is connected is unique for each safety transmitter within the set, by which means, on the basis of the connections made, the safety switching device can identify on start-up what type of safety transmitter is connected, and what function is required in the case of like safety transmitters. The safety switching device automatically selects the operating mode required on the basis of this association. In other words, the safety switching device has a plurality of input ports, and the user has the option to select one out of a number of operating modes by specifically connecting the safety transmitter to one of these input ports.

Although this safety switching device has been proven in practice, there is still a desire for improvement.

SUMMARY OF THE INVENTION

It is an object of the present invention to provide a safety switching device with high flexibility in terms of operating modes, but which is simpler in design. In particular, the safety switching device is intended to be capable of being produced at lower cost, while having a high flexibility.

It is another object to refine the safety switching device mentioned initially such that a number of operating modes can be selected by using a means with a simple design.

Just another object is to provide a safety switching device which capable of operating in one of a plurality of operating modes, with the selection of the operating mode desired being simple to achieve.

These and other objects are achieved by a safety switching device having an input, which is connected to the operating mode selector unit so that a selector input signal can be supplied to it, with the operating mode selector unit being designed such that it identifies the selector input signal as one of at least three different defined input signals, and, responsive thereto, selects one of at least three defined operating modes assigned to said different selector input signals. The operating mode selector unit can thus select one of at least three operating modes by evaluating a single signal at a single input.

In a method according to the invention the selector input signal is supplied to an operating mode selector unit via one input, with the operating mode selector unit identifying the selector input signal as one of at least three different predefined input signals, and selecting one of at least three predefined operating modes in response thereto.

The advantage of this safety switching device is, in particular, its simple design. It is sufficient to provide a single input for supplying the selector input signal. On the one hand, this allows the physical size of the safety switching device to be reduced while, on the other, it leads to cost savings.

A further major advantage is that there is no need for complex switching elements, which have to be designed in a redundant manner in order to achieve the required safety, for selecting the various operating modes.

In a refinement of the invention, the safety switching device comprises an internal signal generator, which generates the at least three different predefined selector input signals at one output at least.

This measure has the advantage that the at least three different defined selector input signals are always available, without any further effort. The safety switching device can thus be used without any additional generator means. Furthermore, it is particularly advantageous that, when a defective, old safety switching device is replaced, the new safety switching device is switched to the correct operating mode just by transferring the previous terminal wiring. This is very simple and convenient, and, furthermore, avoids safety-critical faults during the replacement of a defective device. In addition, this allows a defective device to be replaced more quickly than in the case of conventional selecting elements.

In a further refinement of the invention, the operating mode selector unit has a comparator for comparing the input signal with at least three different reference signals.

This measure leads to a simple design and, in particular, allows signals which are already present in the safety switching device, for example an operating voltage signal or a 0-volts signal etc., to be used as reference signals.

In a further refinement of the invention, a clock generator is provided, which generates a clock signal and provides this as one of the reference signals. The clock generator preferably generates two different clock signals, and provides these as two of the at least three different reference signals.

These measures make it possible to supply not only a signal at a constant voltage, that is to say for example at an operating voltage or at 0 volts, as the input signal, but to clock the input signal. This leads to the advantage that the input signal may assume different states, and thus also allows identification of different operating modes (more than two). From the design point of view, it is particularly advantageous to use four different input signals, namely a signal at an operating voltage, at 0 volts, with a first clock cycle or with a second clock cycle. Since the safety switching devices already have clock generator for two different clock signals in order to identify cross connections in connecting lines between a safety transmitter and the safety switching device, no additional complexity is therefore required in order to provide the reference signals. However, it is also feasible for a clock generator to be upgraded so that more than the said two clock signals are generated, thus allowing selection of more than four operating modes.

In a further refinement of the invention, at least one output port is provided, which is connected to the clock generator and provides one of the clock signals.

This measure has the advantage that a clock signal which has already been generated in the safety switching device for purposes of identifying cross connections can also be used for selecting the operating modes. It is therefore no need for any additional design measures in order to produce appropriate input signals for the operating mode selector unit.

In a further refinement of the invention, a control device is provided, which is connected to the operating mode selector unit and selects the desired operating mode in response to at least one output signal from the operating mode selector unit. The operating mode selector unit is preferably part of the control device.

It is furthermore preferred for the control device to generate an input signal for a downstream safety switching device, and to provide this at an output. This input signal may be a clock signal from the clock generator, a constant signal at a first voltage level, preferably ground, or a constant signal at a second voltage level, preferably an operating voltage.

These measures have the advantage that they make it possible for the control switching device to select the operating mode of the downstream, series-connected safety switching device. The downstream safety switching device can thus be matched to the type of output signal, for example a clock signal or a constant signal, from the upstream safety switching device.

In a further refinement of the invention, an input is provided for supplying a start signal, in order to select one out of a number of start operating modes. In this case, by way of example, possible start operating modes are "automatic start", "manual start" or "manual monitored start".

This measure allows a further improvement in the flexibility of the safety switching device, since the desired start operating mode can be selected by choosing the start signal which is supplied via the start switch. The start signal, as in the case of the already explained input signal for selection of the operating mode, may thus be a clock signal or a constant signal.

In a further refinement of the invention, a selection gate is provided, to which the input signal and the start signal are supplied and which supplies one of the two signals to the operating mode selector unit in response to a control signal.

In other words, the already explained operating mode selector unit may also be used for selecting the start operating mode, with the control device sending an appropriate control signal to the selection gate, in order to select the start signal or the input signal. The particular advantage of this measure is design simplification, and hence cost savings.

Further advantages and refinements of the invention can be found in the description and the attached drawing.

It goes without saying that the features mentioned above and the features which are still to be explained in the following text may be used not only in the respectively stated combination, but also in other combinations or on their own, without departing from the scope of the present invention.

BRIEF DESCRIPTION OF THE DRAWINGS

The invention will now be described in more detail using exemplary embodiments and with reference to the drawing, in which.

DETAILED DESCRIPTION OF PREFERRED EMBODIMENTS

Figure 1:
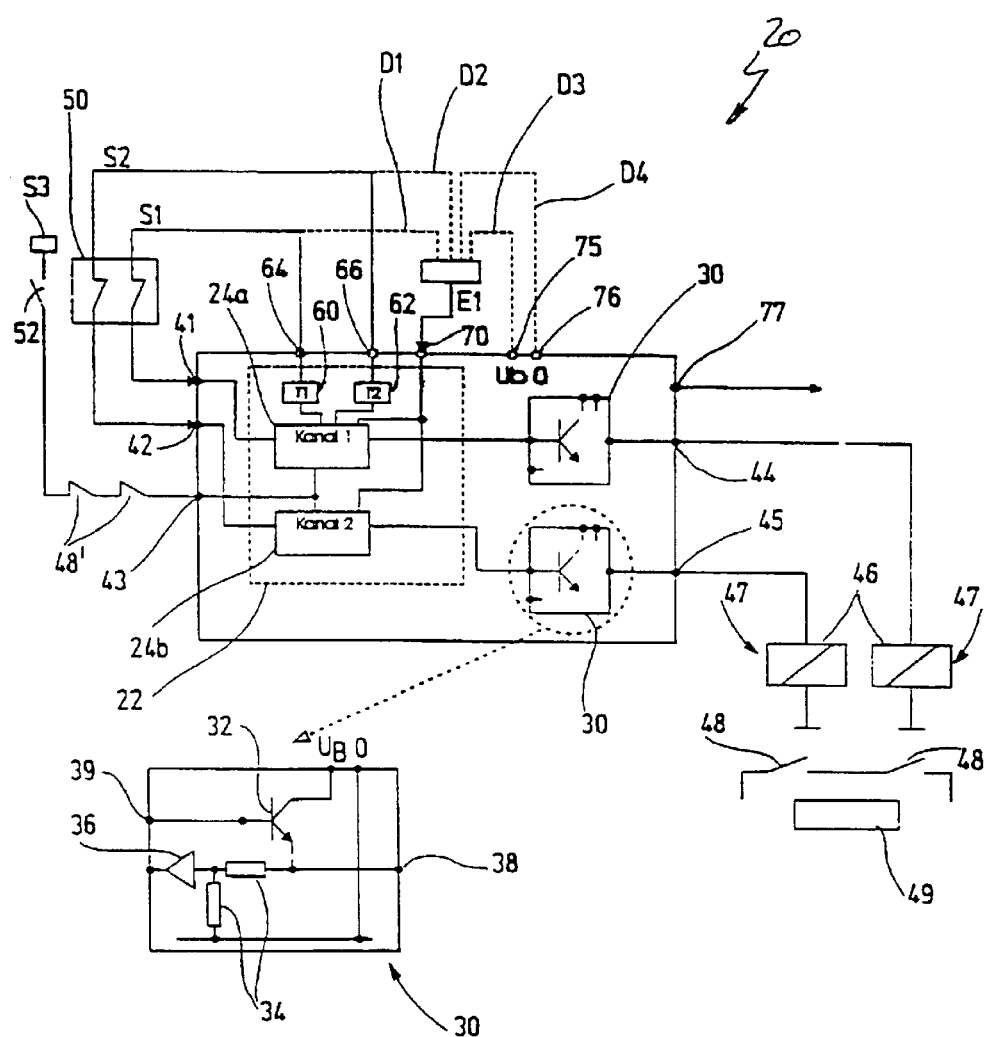
FIG. 1 shows a schematic block diagram of a safety switching device according to the invention.

FIG. 1 shows a schematic illustration of a safety switching device, which is designated by reference symbol 20. The safety switching device 20 has a fail-safe evaluation and control unit 22 schematically indicated. This evaluation and control unit is formed from known components, such as those which are also used in the above-mentioned "PNOZ" safety switching device from the applicant. The particular object of this evaluation and control unit is to safely evaluate switching signals that are supplied, and to generate appropriate output signals.

The evaluation and control unit 22 in the illustrated exemplary embodiment has two channels, with the two channels respectively being designated by reference symbols 24a and 24b. Other configurations of the evaluation and control unit 22 are, of course, also possible. A more detailed explanation of such an evaluation and control unit 22 can be found, by way of example, in the book "Maschinensicherheit" [Machine Safety], Winfried Gräf, Hüthig Verlag, 1997.

The safety switching device 20 also comprises switching elements 30, which receive control signals from the evaluation and control unit 22. This is indicated by lines 26 in FIG. 2.

In the simplest case, the switching element 30 is a transistor, whose base receives the control signal and at whose emitter or collector an output signal is tapped off, in which case the output signal from the switching element may be switched to two different potentials.

In the present exemplary embodiment, in addition to a transistor 32, the switching element 30 has two series-connected resistors 34 and an amplifier 36. The collector of transistor 32 is connected to a first reference potential UB, while the emitter of the transistor 32 is connected to a second potential 0 (ground) via the series-connected resistors 34. The input side of the amplifier 36 is connected to the node of the two resistors 34, producing a feedback read signal at its output 37.

The output signal from the switching element 30 is tapped off at the emitter of the transistor 32, and is available at an output 38. The output signal from the evaluation and control unit 22 is also passed via an input 39 of the switching element 30 to the base of the transistor 32.

The switching element 30 is designed such that the signal which is generated at the output 38 of the switching element is switched between the first potential and the second potential, in response to the signal at input 39. In the present exemplary embodiment, the first potential UB is generated at the output 38 when the input signal at the input 39 equals approximately this potential. When the output signal is close to the second potential, the output signal at the output 38 is likewise at the second potential 0.

For reasons of clarity, the switching element 30 is illustrated in highly simplified form in FIG. 1. However, it will be appreciated that the switching elements 30 are in a corresponding form to the design as just has been described. However, other configurations are also possible in order to achieve the described function of the switching element 30.

The safety switching device 20 shown in FIG. 1 has two input port or input terminals 41, 42, which are connected to the evaluation and control unit 22. In the present exemplary embodiment, a two-channel switch 50 is connected to these two input terminals 41, 42, such that the input terminal 41 has a signal S1 applied to it, and the input terminal 42 has a signal S2 applied to it, when the switch is closed. In this case, by way of example, the switch 50 is an emergency off switch for a machine. The switch 50 may, of course, also be a guard door monitoring switch.

Depending on the desired safety category, the signals S1 and S2 are signals at a constant potential, for example an operating voltage or 0 volts, or are connected to clock signals, in order to make it possible to detect cross connections between the two lines to the input terminals 41, 42.

In addition to said input terminals, the safety switching device 20 also has output terminals 44, 45, with in each case one output terminal 44, 45 being connected to the output 38 of a switching element 30. Each output terminal 44, 45 thus has an associated switching element 30, in which case the output signal from the switching element 30 may be tapped off externally via the appropriate output terminal 44, 45.

The output terminal 44 is connected to an input circuit 46 of a relay 47, or of a contactor or, in general, to an actuator or a further safety switching device. In the same way, the output terminal 45 is connected to an input circuit 46 of a further relay or contactor 47 or, in general, a further actuator or a further safety switching device. Make contacts 48 of the two relays 47 are in each case connected in series and are used for closing or opening a power supply line to a schematically indicated machine 49. In the present exemplary embodiment, the machine 49 runs only when both make contacts are closed, that is to say when a signal which is sufficient for activating the input circuits 46 is produced at both output terminals 44, 45.

The safety switching device 20 has a further input terminal or input port 43, to which a start signal can be supplied. This start signal is generated by a start switch 52, by creating a connection to a signal source S3. This signal source S3 supplies, by way of example, a constant signal (operating voltage, 0 volts) or a clock signal. Two further make contacts 48' of the relay 47 are connected in series with the start switch 52, the two further make contacts 48' are positively linked to the make contacts 48 but, in contrast to them, are in the form of break contacts. This means that the input terminal 43 is always disconnected from the signal source when at least one of the two make contacts 48 is closed.

The basic operation of such a safety switching device 20 is known per se, so that it will be described only briefly.

The safety switching device 20 has the task to close the make contacts 48 when a start signal is applied to the input terminal 43. The machine 49 starts then. If the emergency off switch 50 is pressed in the event of an emergency situation occurring, the evaluation and control unit evaluates this switching event and actuates the switching elements 30 appropriately. The output signals are changed to the second potential (ground), so that the current flow through the two input circuits 46 of the relays 47 is interrupted, with the result that the two make contacts 48 open, and the machine comes to rest. The evaluation and control unit 22 in this case operates safely in the sense of the European Safety Standards, so that, by way of example, welded make contacts 48 of the relay 47 or, for example, a cross connection between the two input terminals 41, 42 is identified. Furthermore, a fault in the switching element 30 can be identified via the feedback read signal which is generated at the output 37.

Further explanatory notes relating to this safety switching device 20 as well as to modifications of it and to the capability to couple such safety switching devices in a different way, for example to connect them in series, are disclosed in a copending application from the same applicant, namely PCT/EP01/02561 which was filed on Mar. 6, 2001 designating the U.S. and which claims priority from DE 100 11 211.0, which was filed on 8 Mar. 2000. The exemplary embodiments described there are included here, by reference, for sake of simplicity.

As can be seen from FIG. 1, the evaluation and control unit 22 has a first clock transmitter 60 and a second clock transmitter 62. The clock transmitters 60, 62 each generate a clock signal, with the two clock signals having different clock periods and/or phases. The clock signals respectively generated are supplied to the channels 24a, 24b (in this case, illustrated only for the channel 24a) on the one hand, and, on the other, they are provided at the output terminals 64, 66. The signals S1, S2, which have already been mentioned, can be tapped off at these two output terminals 64, 66, and they can be supplied via switch 50 to the two input terminals 41, 42. When the switch 50 is closed, the signals S1 and S2 are evaluated in the respective channel 24a, 24b, for example, by comparing the signals each with the clock signal that is produced by the respective clock transmitter 60 or 62. If the comparison indicates that there is no match, the switch 50 is either open or there is a cross connection between the lines, causing the machine 49 being switched off, in both cases.

The safety switching device 20 which is shown in FIG. 1 has a further input terminal, which is identified by the reference symbol 70. This input terminal 70 is connected to the evaluation and control unit 22, where it is connected not only to channel 24a but also to channel 24b. The input terminal 70 is used for supplying an input signal E1 which defines the operating mode in which the safety switching device 20 is intended to operate. For sake of simplicity, the function of this signal is explained with reference to channel 24a only in the following description.

It will be appreciated that exactly the same function is also carried out by channel 24b, in order to achieve a two-channel design, i.e. the operating mode for both channels is selected via the input signal.

Dashed lines in FIG. 1 indicate the source of the signal E1. One option is to connect the input terminal 70 to the output terminal 64 via a wire link D1 so that the signal E1 is supplied from the clock transmitter 60. The second option is to connect the input terminal 70 to the output terminal 66 via a wire link D2, so that the second clock transmitter 62 supplies the signal E1. A third option is a wire link D3 between the input terminal 70 and, for example, a terminal 75 to which the operating voltage is applied. A fourth option, which is indicated by dashed lines in FIG. 1, is to connect a wire link D4 between a terminal 76, which is at 0 volts, and the corresponding input terminal 70. This option may also be achieved, for example, by no signal being applied to the input terminal 70.

In this way, it is possible to use a single wire link to supply one of four signals, which are already present in the safety switching device 20, to the input terminal 70 and hence to the channel 24a and to the channel 24b of the evaluation and control unit 22. As a consequence, it is also possible to select four different operating modes using a single input signal E1.

It has already been mentioned that a start signal S3 can be supplied to the safety switching device 20 via the input terminal 43. As in the case of the input signal E1, this start signal S3 may be tapped off from the output terminals 64, 66 or 75 (a 0V signal cannot be identified due to internal circuitry), so that a total of three different start signals are possible without needing to add any further signal generator to the safety switching device 20. In fact, means which are already available are used for additional functions.

Figure 2:
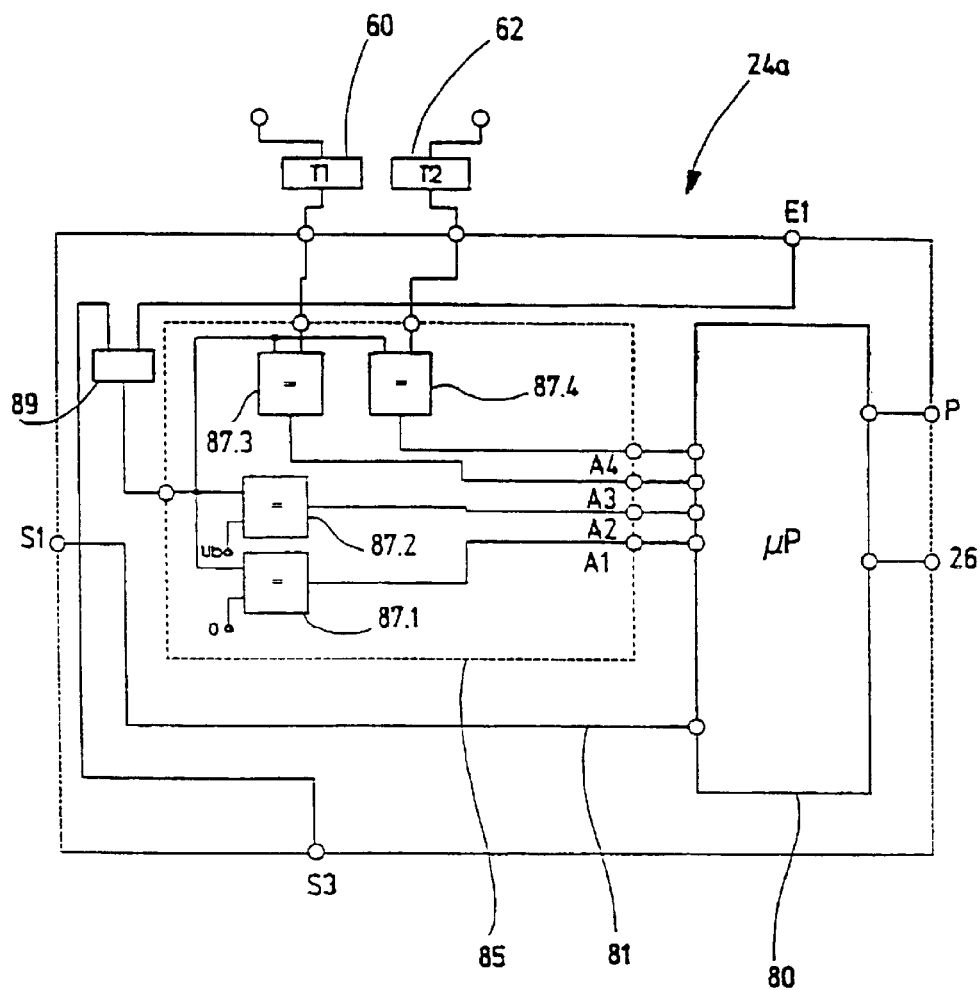
FIG. 2 shows a schematic block diagram of one channel of the safety switching device shown in FIG. 1.

In schematic illustration and representative for the two channels 24a and 24b, FIG. 2 shows a block diagram of channel 24a shown in FIG. 1. This channel 24a has a control device 80, which essentially carries out the safe evaluation of the signal S1 supplied via the input terminal 41. Signal S1 is transmitted via an electrical connection 81. A signal which actuates the downstream switching element 30 is generated at the output 26 of the control device 80, as a function of the signal S1.

A comparator unit 85 is provided for evaluation of the input signal E1, and the comparator unit has the task of determining the type of input signal, i.e. the task of stating which of the possible input signal types (four in the present exemplary embodiment) is being applied. One option to achieve this task is to compare the input signal E1 with each of the possible signal types, i.e. with the clock signals from the two clock transmitters 60, 62, with operating voltage UB, and with voltage 0. Four comparators 87.1, 87.2, 87.3 and 87.4 are provided for this purpose. Each of these comparators 87 is supplied with the signal E1 on the one hand, and with one of the above-mentioned signals on the other. Thus, by way of example, one input of the comparator 87.4 is connected to the clock transmitter 62, one input of the comparator 87.3 is connected to the other clock transmitter 60, and one input of the comparator 87.2 is connected to the operating voltage UB. The four comparators 87.1 to 87.4 generate a total of four output signals A1 to A4, which are supplied to the control device 80 for further evaluation. The control device uses these output signals A1 to A4 to decide which of the four possible operating modes is desired, and it can also select this operating mode in an appropriate manner then. The four output signals A1 to A4 may also be combined to form a two-bit signal, so that only two signals need to be transmitted to the control device 80. Furthermore, it is also feasible that the function of the comparator unit 85 is carried out by the control device 80. This can be done by appropriate configuration of the control device 80, preferably as a microcontroller.

In order to improve the flexibility and to reduce the physical complexity, it is possible for the comparator unit 85 also to be used to determine the type of input signal S3. In order to supply only one of the two signals E1 or S3 to the comparator unit 85, a changeover switch 89 is schematically indicated, which can be switched via a control signal from the control device 80 (not shown in FIG. 2). Three different start operating modes can thus also be selected by the appropriate selection of the signal S3.

As has already been indicated in the introduction, an operating mode comprises, for example, passing clock signals to the input terminals 41 and 42 so that a cross connection between the two supply lines can be identified. Another operating mode is for the switching element 30 to be actuated by the respective channel 24a, 24b such that a clock signal is generated at the output terminals 44, 45. This is advantageous when a safety switching device 20 as shown in FIG. 1 is intended to be connected in series with another safety switching device 20. A detailed description of such a series circuit is given in copending international patent application PCT/EP01/02561 which was filed on Mar. 6, 2001 designating the U.S. and which claims priority from DE 100 11 211.0 filed on Mar. 8, 2000. Reference is made to this corresponding description, for sake of simplicity.

A further operating mode can be selected when the safety switching device 20 is supplied with clock signals from an upstream safety switching device and also has to supply clock signals to a downstream safety switching device. A fourth operating mode can be selected when the safety switching device 20 receives clock signals from an upstream safety switching device 20 but has to generate a constant signal, i.e. not a clock signal, at the output terminals 44, 45. This would result in four possible operating modes, which could be selected by connecting the input terminal 70 to output terminal 64, to output terminal 66, to output terminal 75, or to output terminal 76 (or, alternatively, by omitting the connection).

Furthermore, however, other operating modes are also feasible. It is preferred for the input signal E1 not to have to be produced just for this purpose but, instead, to already exist in the safety switching device 20, where it needs only to be supplied to the output terminal 70 via a simple wire link. Reliability against short circuits etc. is advantageously achieved by the terminals, which are to be connected via the wire links D1 to D4, not being located immediately alongside one another on the safety switching device 20.

Usually, the signal E1 is not evaluated until a check has been carried out to determine whether there are any wiring faults in conjunction with the switch 50, and this is achieved, for example, via the different clock signals. If no wiring faults are present, the control device 80 reads the result of the comparison supplied from the comparator unit 85, and then selects the desired operating mode.

FIG. 2 also shows that the control device 80 supplies a further output signal P, which is produced at an output terminal 77 to be seen in FIG. 1. This signal P may, by way of example, form the input signal E1 for a downstream safety switching device when a number of safety switching devices are connected in series, so that no wire links are required on this safety switching device to connect the terminal 70 to one of the terminals 64, 66, 75 or 76. It is thus possible for the control device 80 to define the operating modes of the downstream safety switching device 20.

In a further exemplary embodiment, which is not illustrated in any more detail here, an operating parameter, for example a delay time for disconnection, is selected via the input signal E1. In a preferred application of such an exemplary embodiment, two functionally identical input terminals 70 are provided, so that the safety switching device can in this case be supplied with two input signals E1. Each of the two input signals E1 may be either 24 volts, 0 volts, a first clock signal or a second clock signal. Thus, overall, in this exemplary embodiment, 16 different delay times can be selected without any complex and expensive multi-position switches being required for this purpose. The various delay times are preferably associated with the two input signals such that the application of the two 0 volt signals results in selection of the shortest possible delay time. This means that the shortest delay time, which is also the safest with regard to emergency situations, is also selected when the input signals E1 are not present, or disappear, as a result of a fault. This embodiment is particularly fast when it is necessary to replace the device, since there is no need to operate any selecting elements for the delay time.

What is claimed is:

1. In a machine installation, a safety switching device for connecting and reliably disconnecting an electrical load in response to a switching event of a safety transmitter, said safety switching device comprising:

a first input port for receiving a first input signal provided from said safety transmitter in correspondence to said switching event;

an evaluation and control unit for evaluating said first input signal, said evaluation and control unit being capable of operating in one of at least three different operating modes;

an operating mode selector unit for selecting an operating mode from said at least three different operating modes;

at least one output switching element controlled by said evaluation and control unit for connecting and reliably disconnecting said electrical load, said output switching element being controlled as a function of the operating mode selected;

a second input port for receiving a selector input signal, said selector input port being coupled to said operating mode selector unit for supplying said selector input signal;

a signal generator for generating a group of at least three different reference signals; and a plurality of output ports coupled to said signal generator for providing said group of reference signals at said output ports;

wherein one of said output ports is coupled to said second input port;

wherein said operating mode selector unit comprises a comparator for comparing said selector input signal received with said at least three different reference signals for identifying the selector input signal received as one from the group of reference signals; and wherein said operating mode selector unit is adapted to select one of said at least three predefined operating modes in response to said selector input signal identified.

2. The safety switching device of claim 1, wherein said reference signals comprise at least: a first clock signal, a constant signal at a first voltage level, and a constant signal at a second voltage level.

3. A safety switching device for connecting and reliably disconnecting an electrical load in response to a switching event of a safety transmitter, said safety switching device comprising:

at least one first input port for receiving a first input signal provided from said safety transmitter in correspondence to said switching event;

an evaluation and control unit for evaluating said first input signal, said evaluation and control unit being capable of operating in one of at least three different predefined operating modes;

at least one output switching element controlled by said evaluation and control unit for connecting and reliably disconnecting said electrical load;

an operating mode selector unit for selecting an operating mode of said evaluation and control unit; and a second input port for receiving a selector input signal, said selector input port being coupled to said operating mode selector unit for supplying said selector input signal;

wherein said operating mode selector unit is adapted to identify said selector input signal as one from a group of at least three different predefined selector input signals, and said operating mode selector unit being further adapted to select one of said at least three predefined operating modes in response to said selector input signal identified.

4. The safety switching device of claim 3, further comprising an internal signal generator for generating at least three different reference signals and a comparator for comparing said selector input signal received with said at least three different reference signals.

5. The safety switching device of claim 4, further comprising at least one output port, said internal signal generator providing said at least three different reference signals at said at least one output port.

6. The safety switching device of claim 5, comprising at least three output ports, one for each reference signal.

7. The safety switching device of claim 4, wherein said internal signal generator comprises a clock generator for generating a first clock signal as one of said reference signals.

8. The safety switching device of claim 7, wherein said clock generator is adapted to generate two different clock signals as two of said reference signals.

9. The safety switching device of claim 3, wherein said selector input signal is selected from a group comprising at least: a first clock signal, a constant signal at a first voltage level, and a constant signal at a second voltage level.

10. The safety switching device of claim 9, wherein said first voltage level is ground and wherein said second voltage level is an operating voltage.

11. The safety switching device of claim 3, further comprising a start input port for supplying a start signal, said start signal selecting one from a number of predefined start operating modes.

12. The safety switching device of claim 11, further comprising a selection gate to which said selector input signal and said start signal are supplied, said selection gate supplying one of said two signals to said operating mode selector unit in response to a control signal.

13. The safety switching device of claim 3, wherein said operating mode selector unit is comprised in said evaluation and control unit.

14. In a safety switching device for connecting and reliably disconnecting an electrical load in response to a switching event of a safety transmitter, said safety switching device being capable of operating in one of at least three different operating modes, a method for selecting an operating mode, said method comprising the steps of:

providing a selector input signal at one input port;

identifying said selector input signal as being one from a group of at least three different predefined input signals; and selecting one of said at least three operating modes in response to said selector input signal identified.

15. The method of claim 14, further comprising the steps of generating at least three different reference signals and, within said step of identifying, comparing said selector input signal with said at least three different reference signals.

16. The method of claim 15, wherein said reference signals are provided at a plurality of output ports, and said selector input signal being provided from one of said output ports.

17. The method of claim 14, wherein said selector input signal is provided from a group comprising at least: a first clock signal, a constant signal at a first voltage level, and a constant signal at a second voltage level.

* * * * *

UNITED STATES PATENT AND TRADEMARK OFFICE
CERTIFICATE OF CORRECTION

| | | |
|---|---|---|
| PATENT NO. | : 6,787,940 B2 | Page 1 of 1 |
| APPLICATION NO. | : 10/264070 | |
| DATED | : September 7, 2004 | |
| INVENTOR(S) | : Jurgen Pullman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 132 days.

Signed and Sealed this

Thirty-first Day of July, 2012

David J. Kappos
*Director of the United States Patent and Trademark Office*